United States Patent [19]

Hashiue

[11] Patent Number: 4,922,101

[45] Date of Patent: May 1, 1990

[54] RADIATION IMAGE-READING METHOD

[75] Inventor: Masakazu Hashiue, Tokyo, Japan

[73] Assignee: Fuji Photo Film Co., Ltd., Kanagawa, Japan

[21] Appl. No.: 308,592

[22] Filed: Feb. 10, 1989

[30] Foreign Application Priority Data

Feb. 10, 1988 [JP] Japan .................................. 63-29840

[51] Int. Cl.$^5$ ............................................. G03B 42/00
[52] U.S. Cl. ................................................. 250/327.2
[58] Field of Search ................. 250/327.2 A, 327.2 D, 250/327.2 E, 327.2 F, 327.2 J

[56] References Cited

U.S. PATENT DOCUMENTS

| | | | |
|---|---|---|---|
| 4,631,407 | 12/1986 | Kawajiri et al. | 250/327.2 |
| 4,692,813 | 9/1987 | Conrad et al. | 250/327.2 |
| 4,767,927 | 8/1988 | Ohyama et al. | 250/327.2 |
| 4,823,007 | 4/1989 | Hanson | 250/327.2 |
| 4,857,733 | 8/1989 | Saotome et al. | 250/327.2 |

Primary Examiner—Constantine Hannaher
Assistant Examiner—Edward Glick
Attorney, Agent, or Firm—Sughrue, Mion, Zinn, Macpeak & Seas

[57] ABSTRACT

A new method of photoelectrically reading out a radiation image of one or more spots which is stored and recorded on a stimulable phosphor sheet, to determine position of the spot on the phosphor sheet, comprises the steps of: scanning the stimulable phosphor sheet under rotation twice with stimulating rays giving a linear irradiation area on a surface of the phosphor sheet to form in total an irradiated area in the form of a ring; detecting stimulated emissions caused by a series of the irradiations of stimulating rays separately for each scanning, for obtaining information as to whether the spot is present or absent on the irradiated linear area; and locating the position of the spot on the phosphor sheet by combining the information of the spot obtained in the twice scanning.

5 Claims, 2 Drawing Sheets

RADIATION IMAGE-READING METHOD

BACKGROUND OF THE INVENTION

1. Field of the Invention

This invention relates to a method of reading out a radiation image of one or more spots stored and recorded on a stimulable phosphor sheet. Particularly, the invention relates to a radiation image-reading method which is advantageously employed for reading out a radiation image of one or more colonies in the form of spot stored and recorded on a stimulable phosphor sheet which is utilized in autoradiography for hybridization of DNA colonies.

2. Description of Prior Art

There has been heretofore known use of a stimulable phosphor sheet as a radiation-sensitive material in the autoradiography for hybridization of DNA colonies.

In the case of screening genes utilizing the autoradiography such as the the case of screening fragments of DNA having a number of base sequences (e.g., human DNA) by a colony hybridization, very troublesome operations are required. For example, in order to find out the desired colony or colonies (one to several colonies) from a great number of colonies such as $10^6$ colonies, the $10^6$ colonies are divided into $10^3$ groups of colonies to give $10^3$ filters carrying each group, and each of those filters is to be examined to detect the location of the desired colonies having a radioactively labeled substance. In other words, in order to find out the desired few colonies from a great number of colonies such as $10^6$ colonies, it is required to detect a filter on which the desired colony or colonies are carried and further to locate positions of the colonies on the filter by examining all of the $10^3$ filters.

In the above-mentioned autoradiography, each position of one or more colonies can be detected using stimulable phosphor sheets (i.e., radiation image storage panels, serving as radiation sensitive material). The radiation sensitive material is used in autoradiography for copying thereon the colony containing a radioactively labeled substance to obtain locational information of the colony on the filter.

The locational information of the colony on the filter can be detected by reading out a radiation image of one or more spots corresponding to the position of the radioactively labeled substance on a stimulable phosphor sheet.

The stimulable phosphor sheet is a sheet comprising a stimulable phosphor which absorbs (stores) a portion of radiation energy when exposed to a radiation and emits a light (stimulated emission) corresponding to the stored energy upon excitation with stimulating rays such as visible light. The stimulable phosphor sheet per se is already known.

For reading out the desired information of the radiation image stored and recorded on the stimulable phosphor sheet, there has been previously proposed or put into practical use a method of irradiating the surface of the stimulable phosphor sheet with stimulating rays to perform raster scanning or plane spiral scanning with a spot of convergent stimulating rays condensed into a point and detecting the stimulated emission produced under the irradiation, by means of a photodetector. In this method, it is required to scan the whole surface of the stimulable phosphor sheet with the stimulating rays, so that a long period of time is needed for reading one phosphor sheet. For one screening process of DNA, the above-mentioned reading operation should be done with respect to all of the $10^3$ filters, and hence an extremely long period of time is needed for one DNA screening. In the above-mentioned case, for instance, the proportion of the colonies to be found out to all of the colonies in one DNA screening process is very small, namely, a proportion of only one to several colonies to $10^6$ colonies, and therefore the desired (aimed) colony does not exist in most of the filters. Accordingly, it is unfavorable to spend such a long period of time for detecting the filters where aimded colonies may exist at such small proportion, and hence it is desired to make the time for reading the radiation image as short as possible and to efficiently perform one screening operation in a short period of time.

Further, it is unfavorable to store a master plate having colonies therein for a long time, because the colonies are not always stable. From this viewpoint, the time for reading the radiation image is required to be shortened.

Furthermore, the genetic screening has been widely carried out with the development of biotechnology, and the procedure of reading out radiation image of one or more spots on a stimulable phosphor sheet is more frequently utilized in the autoradiography, so that the apparatus for reading out the radiation image employed in the autoradiography is desired to be minimized, simplified and obtainable at a low cost.

SUMMARY OF THE INVENTION

The object of the invention is to provide a radiation image-reading method in which a radiation image of one or more spots stored and recorded on a stimulable phosphor sheet can be read out for a prominently shortened time, as compared with the conventional reading method (i.e., less than one-fifth or one-sixth of the period of time in the conventional procedure).

It is another object of the invention to provide a radiation image-reading method which can be effectively performed for autoradiography in the genetic screening.

There is provided by the present invention a method of photoelectrically reading out a radiation image of one or more spots which is stored and recorded on a stimulable phosphor sheet, to determine position of the spot on the phosphor sheet, comprising the steps of:

scanning the stimulable phosphor sheet under rotation twice with stimulating rays giving a linear irradiation area on a surface of the phosphor sheet to form, in total, an irradiated area in the form of a ring in such manner that the linear irradiation area of one scanning forms an angle other than 0° with the linear irradiation area of another scanning;

detecting stimulated emissions which are produced in response to a series of the irradiations of stimulating rays separately for each scanning, for obtaining information as to whether the spot is present or absent on the irradiated linear area; and locating the position of the spot on the phosphor sheet by combining the informations of the spot obtained in the twice scanning.

In the radiation image-reading method of the invention, stimulating rays giving a linear irradiation area (irradiated area in the form of a line, i.e., narrow linear area) on the stimulable phosphor sheet are use in place of the generally employed stimulating rays to give a tiny radiation spot (i.e, irradiated area in the form of a spot, that is "beam spot"), and the stimulable phosphor sheet is scanned twice (or more, if desired) with stimulating rays. The stimulating rays used in one scanning are different from those used in another scanning in such a manner that any linear irradiation area of one stimulating rays forms an angle other than 0° with any linear irradiation area of another stimulating rays. Therefore, the reading time is prominently shortened as compared with the conventional reading method utilizing stimulating rays in the form of a tiny spot in the scanning. Further, since the mechanical motion for the scanning in the reading method of the invention is only the rotatory motion of the stimulable phosphor sheet (or the stimulating rays), an appropriate radiation image-reading apparatus can be manufacture at a low cost.

Accordingly, the radiation image-reading method of the present invention is advantageously employed particularly for reading out a radiation image of autoradiograph in the DNA screening utilizing autoradiography in which a great number of reading operations should be performed for a short period of time for detecting a small number of radiation image comprising one or more spot images.

DETAILED DESCRIPTION OF THE INVENTION

The radiation image-reading method of the invention is performed in such manner that the first scanning (one scanning) and the second scanning (another scanning) can be performed using one stimulating rays-source or two stimulating rays-sources.

In the radiation image-reading method of the invention, a prolongation (i.e., prolonged line) of the linear irradiation area of one of the stimulating rays for scanning preferably passes over the center of the rotation of the stimulable phosphor sheet.

In the radiation image-reading method of the invention, the angle formed by the linear irradiation area of one of the stimulating rays for scanning preferably not only coincides with the tangent line of the innermost fringe of the torus to be scanned, but also ends at the point of contact of said innermost fringe and its tangent line. The angle formed by the linear irradiation area of one stimulating rays and the linear irradiation area of another stimulating rays is in the range of preferably 10° to 90°, more preferably 30° to 90°, and most preferably 60 to 80°.

The present invention is described below referring to the attached drawings.

Figure 1:
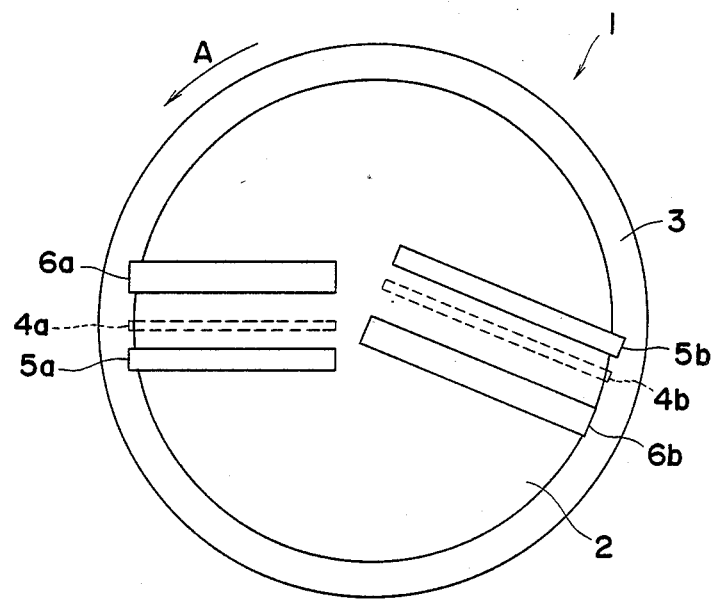
FIG. 1 is a schematic plan view of a reading apparatus for performing the radiation image-reading method of the present invention.
Figure 2:
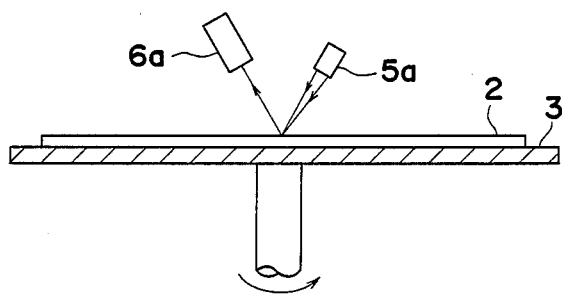
FIG. 2 is a front view on the left side of the apparatus shown in FIG. 1 (partially omitted).

In FIGS. 1 and 2, a reading apparatus 1 comprises a rotating plate S for arranging a stimulable phosphor sheet 2 thereon which rotates in its plane in the direction indicated by an arrow A, a light source 5a as a channel "a" for irradiating simultaneously a linear area 4a of the stimulable phosphor sheet 2 with stimulating laser rays to form the linear irradiation area, a photoelectric conversion receptor 6a for receiving stimulated emission emitting from the irradiated linear area 4a and converting the stimulated emission to electric signals, a light source 5b as a channel "b" for irradiating a linear area 4b of the stimulable phosphor sheet 2 with stimulating laser rays, and a photoelectric conversion receptor 6b for receiving the stimulated emission emitting from the irradiated linear area 4b and converting the stimulated emission to electric signals.

The light sources 5a, 5b and the photoelectric conversion receptors 6a, 6b are arranged in the reading apparatus in such manner that the linear direction of the linear irradiation area 4a would coincides with the radius direction of the rotating plate 3 and the linear direction of the linear area 4b would cross the radius direction of the rotating plate S. The surface of the stimulable phosphor sheet 2 is irradiated with stimulating rays emitting from the light sources 5a, 5b under rotation of the rotating plate S to form, in total, two irradiated planes of circular form (i.e., ring or doughnut) by the sweep of the irradiated linear areas 4a, 4b. In order to make the shapes of both ring sweep same as each other, the length of the linear area 4b is made larger than that of the linear area 4a.

Since the light sources 5a, 5b are provided in the above manner, the angle between the linear direction of the irradiated area 4a and the radius direction of the torus differs from the angle between the linear direction of the irradiated area 4b and the radius direction of the torus.

As the light sources 5a, 5b, there can be used a variety of light sources such as gas lasers (e.g., He-Ne laser), other lasers (e.g., semiconductor laser), light emitting diode (LED), an incandescent electric lamp and a flashlamp. If desired, a short wavelength light-cut filter can be employed in combination with a light source.

As the photoelectric conversion receptors 6a, 6b, there can be used a photodetector such as a photomultiplier. In the photoelectric conversion receptors 6a, 6b is provided a cut filter for cutting stimulating rays or the like and transmitting only a light of certain wavelength to receive only the light of stimulated emission. Further, the photoelectric conversion receptors 6a, 6b are optionally equipped with other devices such as an amplifier and an A/D converter for transmitting the obtained information for the radiation image as digital signals.

The radiation image (in the form of a latent image) of plural spots on stimulable phosphor sheet 2 can be read out in the following manner using the reading apparatus. Under rotating the rotating plate S at a predetermined rate, the area 4a on the surface of stimulable phosphor sheet 2 which is placed on the rotating plate 3 and is rotated together with the plate is irradiated with the stimulating rays given by the light source 5a in the channel "a". Owing to the rotation of stimulable phosphor sheet 2, the radiation image of plural spots on the stimulable phosphor sheet 2 enters the irradiated area 4a, and at that time the radiation image of plural spots gives stimulated emission. The light of the stimulated emission is received and converted to electric signals by the photoelectric conversion receptor 6a, and the electric signals are transmitted to an appropriate display device to form a visible image of the spot image thereon. The radiation image of plural spots moves towards the channel "b" with the rotation of the rotating plate 3, and the same process in the channel "a" is also carried out in the channel "b".

The locational information on the radiation image of plural spots obtained in the channel "a" and the channel "b" is not discriminated (identified) with respect to the location in the linear direction of the irradiated areas 4a, 4b in each channel, and hence the location of the radiation image of plural spots in the linear direction of the irradiated areas 4a, 4b is not clear. However, the angles formed by the linear direction of the irradiated area and the radius direction of the abovementioned torus are different from each other between in the channel "a" and the channel "b" as stated above, so that the phases of the radiation image of plural spots obtained independently in the channel "a" and the channel "b" are appropriately combined with each other to obtain information on the dimensional location of the radiation image of plural spots, for instance, using a graphical illustration.

The method of reading out the radiation image of plural spots on stimulable phosphor sheet 2 using the above-mentioned reading apparatus is now described in more detail.

In this radiation image-reading method, stimulable phosphor sheet recorded with a radiation image of plural spots containing the radioactively labeled substance on a filter, which has been obtained by autoradiography in genetic screening for colony hybridization, is employed as an example of stimulable phosphor sheet 2.

Figure 3:
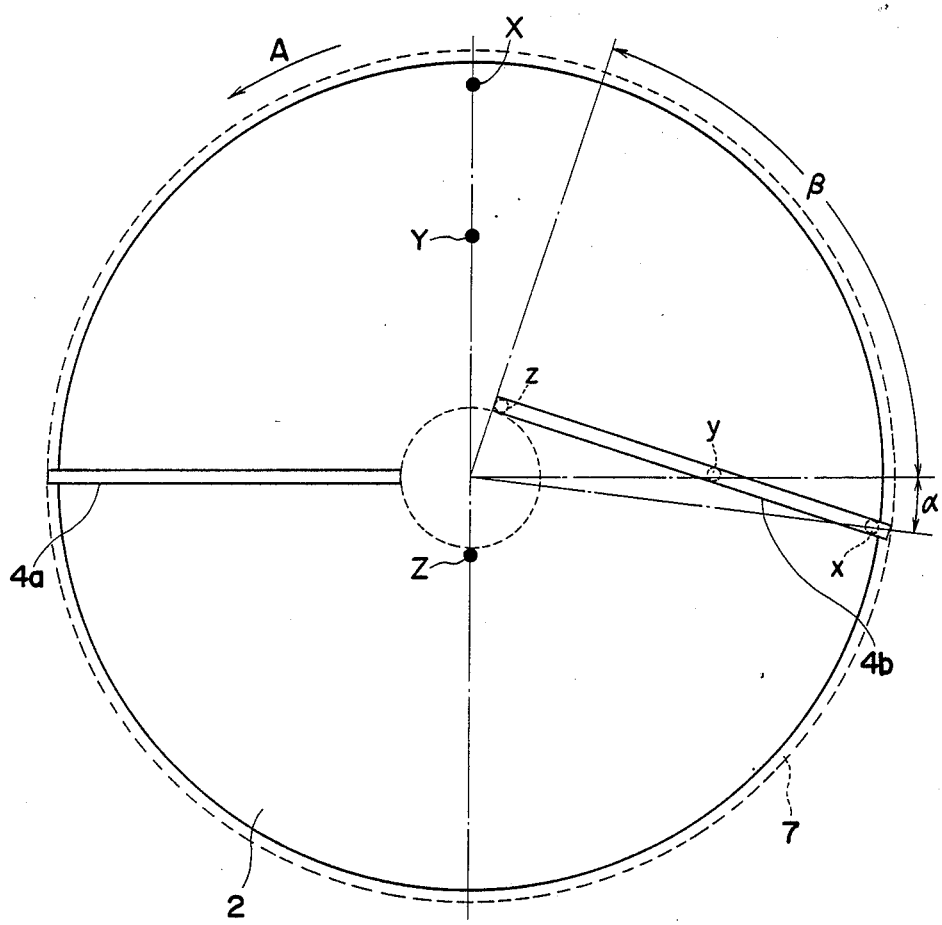
FIG. 3 is a schematic plan view of the reading apparatus for illustrating the radiation image-reading method of the invention.

In FIG. 3, stimulable phosphor sheet 2 rotates in the direction indicated by an arrow A. Accordingly, an irradiated area 7 of circular form (i.e., torus or ring) is relatively formed by sweep of the irradiated areas 4a, 4b. On stimulable phosphor sheet 2, radiation images of spots X, Y and Z are present.

The position of the irradiated area 4a in the channel "a" is set to phase 0°, and the position thereof shown in FIG. 3 is determined as a starting point. When the stimulable phosphor sheet 2 rotates by 90°, X and Y enter the irradiated area 4a, and this is detected by the receptor of channel "a". In this detection, the light of stimulated emission given by X and Y is also detected, so that the presence of the radiation image of two spots X and Y and the locations of X and Y are not identified. Only confirmed is that the certain image is present on the phase of 90°. In the same manner, it is also confirmed that Z is present on the phase of 270°.

When the stimulable phosphor sheet 2 rotates by $(90+\beta)°$ from the starting point, Z enters the irradiated area 4b, and this is detected by the receptor of the channel "b". Subsequently, when the stimulable phosphor sheet 2 rotates by $(270-\alpha)°$ from the starting point, X enters the irradiated area 4b (spot x), and this is detected by the receptor of channel "b". Thereafter, when the phosphor sheet 2 rotates by 270° from the starting point, Y enters the irradiated area 4b (spot y), and this is detected by the receptor of channel "b". Hence, the locations of of spots X and Y (having been not discriminated or distinguished from each other in the channel "a") are discriminated or distinguished from each other in the channel "b", because those phases differ from each other in the channel "b".

The phases of the spots X, Y and Z in the channel "a" and the channel "b" where peaks of the waveforms of the detected signals are obtained are shown in Table 1.

TABLE 1

| Spot | Channel "a" | Channel "b" |
|---|---|---|
| X | 90° | $(270-\alpha)°$ |
| Y | 90° | 270° |
| Z | 270° | $(90+\beta)°$ |

The values of $\alpha$ and $\beta$ depend on the locations of the radiation image of spots in the above-mentioned radius direction, because the angle between the linear direction of the irradiated area 4a and the radius direction of the above-mentioned torus differs from the angle between the linear direction of the irradiated area 4b and the radius direction of the above-mentioned torus in the reading apparatus 1 (that is, the irradiated area 4a coincides with the radius direction of the torus and the irradiated area 4b crosses the radius direction of the torus in the reading apparatus), and those values are specifically determined based on the region of the position in the abovementioned radius direction in which there is a possibility of presence of the target radiation image of more spots.

In FIG. 3, accordingly, the phase of the channel "a" indicates the radius line of stimulable phosphor sheet 2 on which the radiation image of plural spots is present, and the phase of the channel "b" indicates the distance of the radiation image of spots on said radius line from the center of the torus. From those two phases of the channels "a" and "b", the location of the aimed radiation image of spots on stimulable phosphor sheet 2 can be specified by the resolving power restricted by the width of the irradiated areas 4a, 4b and the like.

The radiation image-reading method of the present invention is effectively employed especially for reading stimulable phosphor sheet wherein the radiation image of plural spots are present at a larger interval than the width of the irradiated areas 4a, 4b. When the interval between the adjacent spot images is smaller than the width of the irradiated areas 4a, 4b, a number of spot images partially exist in the irradiated areas 4a, 4b, and hence difference of amount of the stimulated emission caused by the phase difference is hardly observed because the detection of the stimulated emission is for detecting the total amount of the stimulated emission given from the irradiated area. For this reason, the phase of the radiation image of plural spots can be hardly measured in the case that the interval between the adjacent radiation images is smaller than the width of the irradiated areas 4a, 4b. Hence, for enhancement of the reading accuracy, the stimulating rays given by the light source 5a, 5b are preferably controlled to make the width of the irradiated areas 4a, 4b as small as possible. In the case of reading out radiation images of spots on a stimulable phosphor sheet obtained in autoradiography for colony hybridization, the spot images being generally extremely far from each other, it is enough that the width of the irradiated areas 4a, 4b be approx. 0.1 mm or larger.

FIG. 1 shows an embodiment in which stimulable phosphor sheet 2 is rotated by means of a rotating plate 3, but in the invention, the channels "a" and "b" may be rotated keeping the locational relationship therebetween under fixing or rotating the stimulable phosphor sheet 2.

In FIG. 1, the channels "a" and "b" are separately arrange, but only one channel using the same light source and the same receptor can be made to have both functions by performing two scanning processes varying the linear direction of the irradiated area.

Further, the light sources 5a, 5b and the receptors 6a, 6b may be arranged in such a manner that the stimulable phosphor sheet 2 is sandwiched between the light sources and the receptors.

The location of the spot image stored and recorded on stimulable phosphor sheet is detected as described above, whereby the location of the aimed colony on the filter can be detected and the screening of genes can be made.

Only one stimulable phosphor sheet may be exposed to one or plural filters, and in the case of exposure to plural filters, each filter is beforehand and appropriately labeled for discriminating each filter.

In the radiation image-reading method of the invention, one to several numbers of stimulable phosphor sheet may be placed on the above-mentioned rotating plate.

I claim:

1. A method of photoelectrically reading out a radiation image of one or more spots which is stored and recorded on a stimulable phosphor sheet, to determine position of the spot on the phosphor sheet, comprising the steps of:

scanning the stimulable phosphor sheet under rotation twice with stimulating rays giving a linear irradiation area on a surface of the phosphor sheet to form, in total, an irradiated area in the form of a ring in such manner that the linear irradiation area of one scanning forms an angle other than 0° with the linear irradiation area of another scanning;

detecting stimulated emissions which are produced in response to a series of the irradiations of stimulating rays separately for each scanning, for obtaining information as to whether the spot is present or absent on the irradiated linear area; and locating the position of the spot on the phosphor sheet by combining the informations of the spot obtained in the twice scanning.

2. The method as claimed in claim 1, wherein one scanning and another scanning is performed using one stimulating rays-source.

3. The method as claimed in claim 1, wherein one scanning and another scanning is performed using two stimulating rays-sources.

4. The method as claimed in claim 1, wherein a prolongation of the linear irradiation area of one of the stimulating rays passes over a center of the rotation of the stimulable phosphor sheet.

5. The method as claimed in claim 1, wherein the angle formed by the linear irradiation area of one of the stimulating rays for scanning coincides with the tangent line of the innermost fringe of the torus to be scanned, and further ends at the point of contact of said innermost fringe and its tangent line.

* * * * *